US007221659B1

(12) United States Patent
Surazski et al.

(10) Patent No.: US 7,221,659 B1
(45) Date of Patent: May 22, 2007

(54) METHOD AND SYSTEM FOR MANAGING ERRONEOUS ATTENUATION OF SIGNAL

(75) Inventors: Luke K. Surazski, San Jose, CA (US); Michael E. Knappe, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1072 days.

(21) Appl. No.: 10/039,158

(22) Filed: Dec. 31, 2001

(51) Int. Cl.
*H04B 3/20* (2006.01)

(52) U.S. Cl. .................. 370/286; 370/287; 455/570

(58) Field of Classification Search ........ 370/352–355, 370/286–292, 433, 513; 379/3
See application file for complete search history.

(56) References Cited

U.S. PATENT DOCUMENTS

| 4,414,432 | A |   | 11/1983 | Skerlos et al. ............... 179/2 |
|---|---|---|---|---|
| 4,689,506 | A | * | 8/1987 | Pace et al. ................. 327/513 |
| 4,715,063 | A |   | 12/1987 | Haddad et al. ............ 379/390 |
| 5,365,583 | A |   | 11/1994 | Huang et al. .............. 379/390 |
| 5,933,495 | A | * | 8/1999 | Oh ........................ 379/406.08 |
| 5,995,607 | A | * | 11/1999 | Beyda et al. .......... 379/202.01 |
| 6,269,161 | B1 |   | 7/2001 | McLaughlin et al. ....... 379/406 |
| 6,385,195 | B2 | * | 5/2002 | Sicher et al. ............... 370/356 |
| 6,577,862 | B1 | * | 6/2003 | Davidson et al. .......... 370/433 |
| 6,745,055 | B1 | * | 6/2004 | Iyengar et al. .......... 455/569.1 |
| 2003/0063578 | A1 | * | 4/2003 | Weaver ..................... 370/289 |
| 2003/0078767 | A1 | * | 4/2003 | Nayak ....................... 704/200 |

* cited by examiner

*Primary Examiner*—Hassan Kizou
*Assistant Examiner*—Salman Ahmed
(74) *Attorney, Agent, or Firm*—Baker Botts L.L.P.

(57) ABSTRACT

According to one embodiment of the invention, a method for managing communication impairments between Internet Protocol devices is provided. The method includes determining a transmission of a signal comprising a comfort noise, where the signal is transmitted from a first endpoint to a second endpoint. The method also includes sending a notice signal from the first endpoint to the second endpoint indicating that the signal is transmitted. The method also includes suppressing the signal at the second endpoint in response to the notice signal. According to another embodiment of the invention, a method for managing communication impairments between an Internet Protocol ("IP") phone and an IP device is provided. The method provides sending a status signal to the device indicating that the phone is operating as a speakerphone. The method also includes suppressing the transmission of any comfort noise to the phone in response to the status signal.

26 Claims, 3 Drawing Sheets

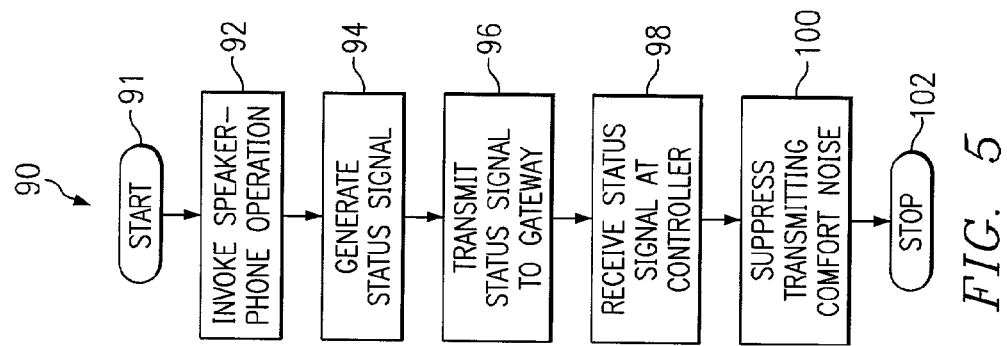
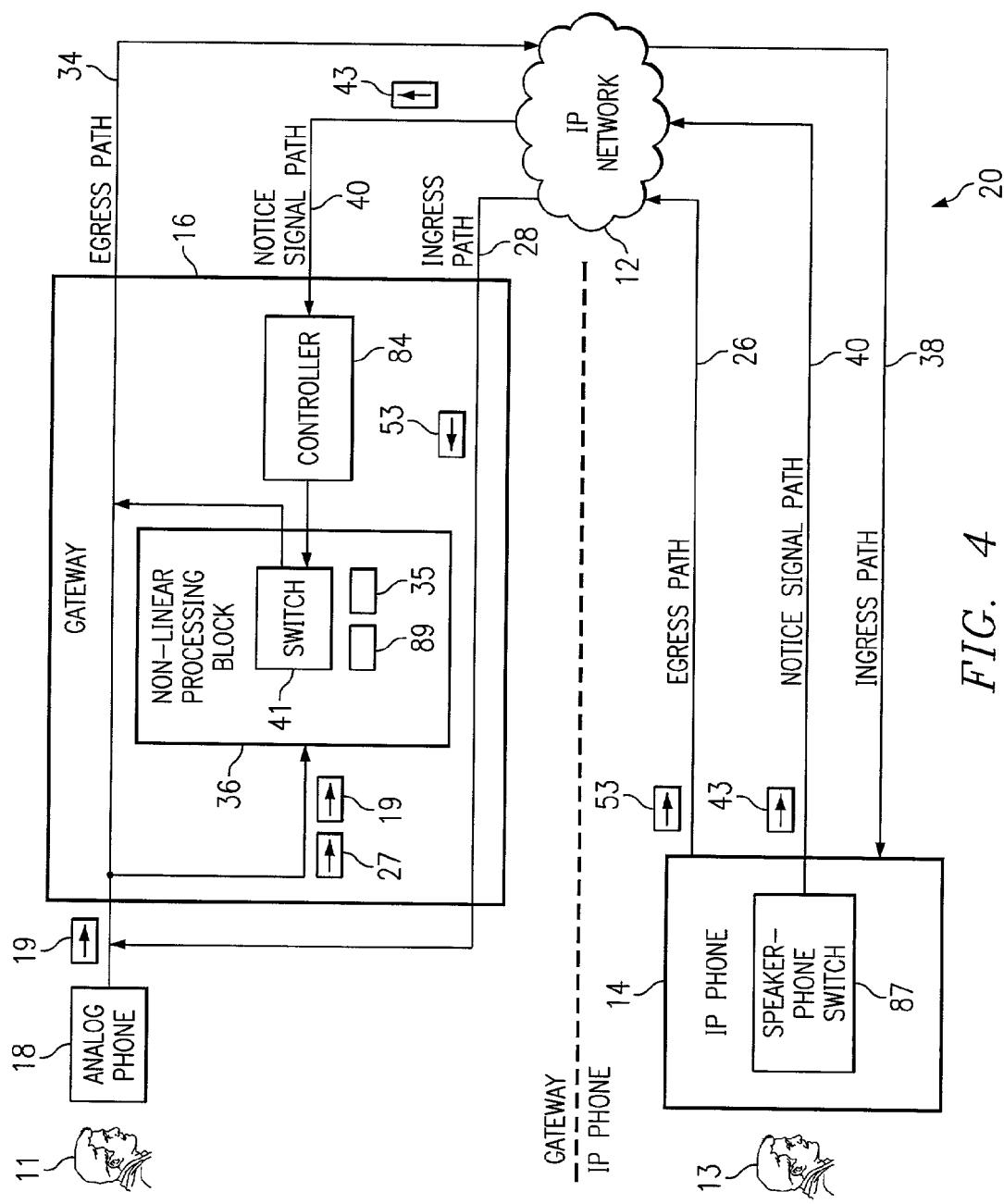
FIG. 5
FIG. 4

METHOD AND SYSTEM FOR MANAGING ERRONEOUS ATTENUATION OF SIGNAL

TECHNICAL FIELD OF THE INVENTION

This invention relates generally to communication and more particularly to a method and a system for managing erroneous attenuation of signal.

BACKGROUND OF THE INVENTION

The Internet is fast becoming a versatile media for communication. Devices using Internet Protocol ("IP") are able to meet a variety of communication needs, including telephone calls and video conferencing. Even analog telephones can communicate over the Internet using a gateway that serves as an interface between the analog domain and the digital domain. However, communications involving IP devices may occasionally suffer from impairments. For example, a user at one endpoint of the communication session may receive echoes of the user's own speech, which is an inconvenience and a source of confusion for the user. To control this and other impairments, IP devices often use non-linear processes.

Conventional non-linear processes include non-linear gain control and comfort noise generation implemented by voice activity detection and echo cancellation devices. Although these non-linear processes help manage impairments, they may also create impairments of their own. One example of such impairment is erroneous attenuation of communication signals. Erroneous attenuation sometimes occurs when IP devices are in half-duplex mode, which means allowing transmission in only one direction at a time.

SUMMARY OF THE INVENTION

According to one embodiment of the invention, a method for managing communication impairments between Internet Protocol devices is provided. The method includes receiving a notice of a transmitted noise. The method also includes granting, in response to the notice, priority to an outgoing signal over the transmitted noise.

According to another embodiment of the invention, a method for managing communication impairments between an Internet Protocol phone and an Internet Protocol device is provided. The method includes receiving a status signal at the device. The status signal indicates that the phone is operating as a speakerphone. The method also provides suppressing, in response to the status signal, transmission of any comfort noise to the phone.

Some embodiments of the invention provide numerous technical advantages. Some embodiments may utilize some, none, or all of these advantages. For example, according to one embodiment, parties involved in a communication session experience an improvement in the quality of communication. The improvement results from one endpoint helping the other endpoint to avoid erroneous transmissions by warning the other endpoint of incoming error-causing noises such as masked echo. According to another embodiment, parties involved in a communication session reduce the number of transmission error. The reduction in error results from one endpoint requesting the other endpoint not to transmit unwanted noise such as masked echo signal at certain times when the probability of transmission error may be high. With the reduction of the number of transmission error, the quality of communication session is improved.

Other technical advantages may be readily ascertained by one of skill in the art.

BRIEF DESCRIPTION OF THE DRAWINGS

Reference is now made to the following description taken in conjunction with the accompanying drawings, wherein like reference numbers represent like parts, in which:

FIG. 4 is a block diagram illustrating another embodiment of a system of managing communication impairments between IP devices; and FIG. 5 is a flow chart illustrating another embodiment of a method for managing communication impairments between an IP phone and an IP device, wherein the method may be implemented by the system shown in FIG. 4.

DETAILED DESCRIPTION OF EXAMPLE EMBODIMENTS OF THE INVENTION

Embodiments of the invention are best understood by referring to FIGS. 1 through 5 of the drawings, like numerals being used for like and corresponding parts of the various drawings.

Figure 1:
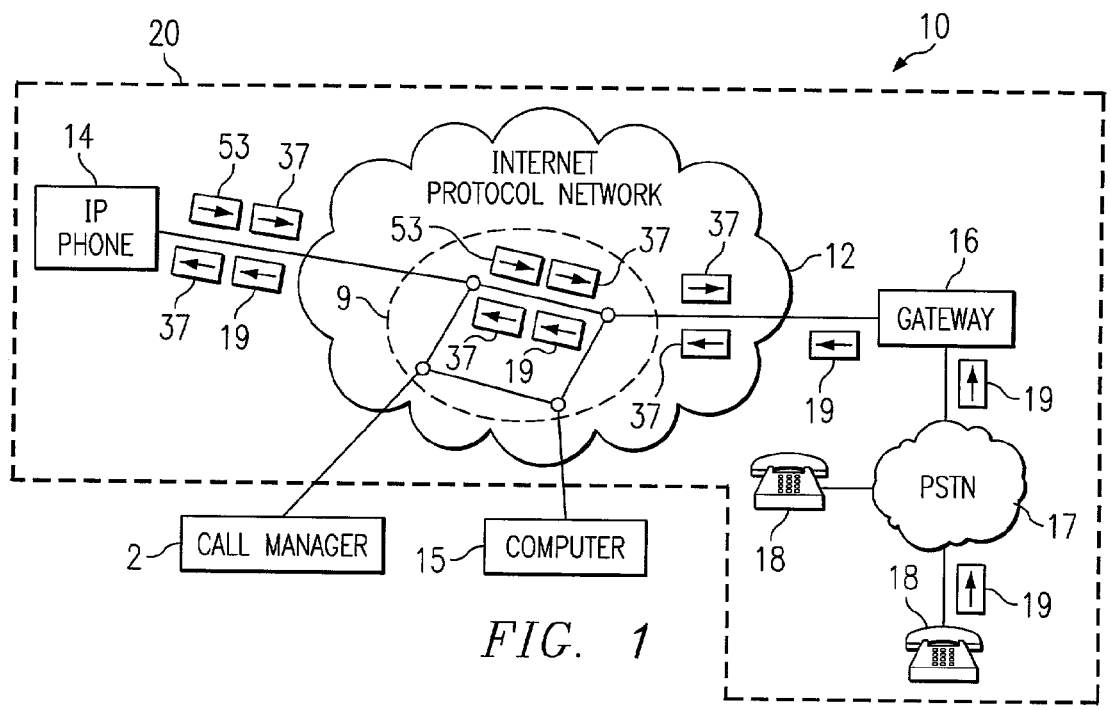
FIG. 1 is a schematic diagram illustrating an example of a communication network that may benefit from the teachings of the present invention.

FIG. 1 is a schematic diagram showing an example communication network 10 that may benefit from the teachings of the present invention. Communication network 10 includes an Internet Protocol ("IP") network 12 having one or more nodes 9. A variety of devices may be coupled to each other through nodes 9 of IP network 12. Examples shown are an IP phone 14, a computer 15, a call manager 2, and an analog phone 18 coupled to IP network 12 through a Public Service Telephone Network ("PSTN") 17 and a gateway 16.

Gateway 16 is an interface between the analog domain of PSTN 17 and the digital domain of IP network 12. Gateway 16 allows analog devices, such as analog phone 18, to communicate with IP devices, such as IP phone 14. In one embodiment, a system 20 includes analog phone 18 that is communicating with IP phone 14 through gateway 16 and IP network 12.

Analog phone 18 and IP phone 14 in system 20 are representative endpoints used to describe some of the embodiments of the invention. However, any IP device, including IP phone 14, analog phone 18 using gateway 16, computer-based audio applications using computer 15, and cellular or other mobile communication devices, may benefit from the teachings of the present invention. Call manager 2 may be used by the IP devices to set up, maintain, and tear down the communication session; however, in other embodiments call manager 2 is not utilized.

In a communication session between analog phone 18 and IP phone 14, both analog phone 18 and IP phone 14 transmit their respective communication signals 19 and 53 to each other over IP network 12. Communication signal 19 travels from analog phone 18 to IP phone 14 through PSTN 17, gateway 16, and IP network 12. Gateway 16 converts communication signal 19's analog format to a digital format. Gateway 16 also attempts to refrain from transmitting back to IP phone 14 any echo caused by receiving communication signal 53. Receiving communication signal 53 may cause the echo because, for example, there may be distortions in the lines within gateway 16. If the echo of communication signal 53 is transmitted back to IP phone 14, a user of IP phone 14 hears the echo of the user's own speech. This causes confusion and inconvenience for the user.

Gateway 16 attempts to prevent the transmission of the echo of communication signal 53 by using an echo cancellation process. However, during the process of cancelling the echo, gateway 16 may inadvertently attenuate the natural background noise associated with outgoing communication signal 19. Because sufficient background noise in a communication session helps users assure themselves that the communication session is still in progress, not having enough background noise creates a false illusion for the users that the communication session has been terminated. Thus, inadvertent attenuation of the natural background noise during the echo cancellation process is also inconvenient and creates confusion for the users. As a remedy, gateway 16 masks the insufficient natural background noise by inserting artificial background noise. By masking the lack of natural background noise with artificial background noise, gateway 16 generates a masked echo signal 37. Gateway 16 intends masked echo signal 37 to be received as natural background noise that provides comfort to the user of IP phone 14. Communication signal 19 and masked echo signal 37 travel through IP network 12 and reach IP phone 14.

IP phone 14 transmits communication signal 53 to analog phone 18 through IP network 12. Communication signal 53 travels through gateway 16, which converts communication signal 53's digital format to an analog format, and PSTN 17. Communication signal 53 is already in a digital format because IP phone 14 converts analog input of the user into the digital format. As with gateway 16, IP phone 14 attempts to refrain from transmitting echoes of communication signal 19 back to gateway 16 for analogous reasons discussed above in conjunction with gateway 16. IP phone 14 also uses an echo cancellation process to prevent transmission of echo and, when the background noise associated with communication signal 53 is inadvertently attenuated during the echo cancellation, IP Phone 14 masks the lack of natural background noise by inserting artificial background noise. The masking process yields a masked echo signal 37. Communication signal 53 and masked echo signal 37 travel through IP network 12, gateway 16, and PSTN 17 to reach analog phone 18.

If IP phone 14, or any other IP device, is in half-duplex mode and communication signal 53 is transmitted as communication signal 19 arrives, IP phone 14 may attenuate outgoing communication signal 53 in favor of incoming communication signal 19. Outgoing communication signal 53 is attenuated so that parties do not communicate over each other, which is an example of the intended effect of the half-duplex mode. Analog phone 18 or gateway 16 may also conduct an analogous half-duplex operation.

However, during the attenuation of outgoing communication signal 53 in favor of incoming communication signal 19, IP phone 14 may mistake incoming masked echo signal 37 as incoming communication 19, and erroneously attenuate outgoing communication 53 in favor of incoming masked echo signal 37. One example of a cause of this error is when masked echo signal 37 is too loud. As a result, in one example involving voice communication, the user of analog phone 18 receives only a low volume speech or a dull sound instead of the intended speech of the user of IP phone 14. If gateway 16 makes an error analogous to the one described above in conjunction with IP phone 14, the user of IP phone 14 may also receive only a low volume speech or a dull sound instead of the intended speech of the user of analog phone 18.

According to the teachings of the invention, a method and system are provided that allow endpoints such as IP phone 14 and analog phone 18, to avoid erroneous attenuation of outgoing communication signals 19 and 53 by sending notification of either (1) transmission of masked echo signal 37 or (2) the conducting of half-duplex operation by an endpoint. For example, gateway 16 may send a warning to IP phone 14 of an incoming masked echo signal 37 or other types of noise, which allows IP phone 14 to avoid attenuating any outgoing signals based on masked echo signal 37. Also, IP phone 14 may send a warning to gateway 16 that IP phone 14 is in half-duplex mode, which allows gateway 16 to refrain from transmitting any masked echo signal 37. This is advantageous because avoiding erroneous attenuation of communication signals 19 and 53 yields higher quality communication sessions between endpoints. Additional details of example embodiments of the system and method are described in greater detail below in conjunction with FIGS. 2 through 5.

Figure 2:
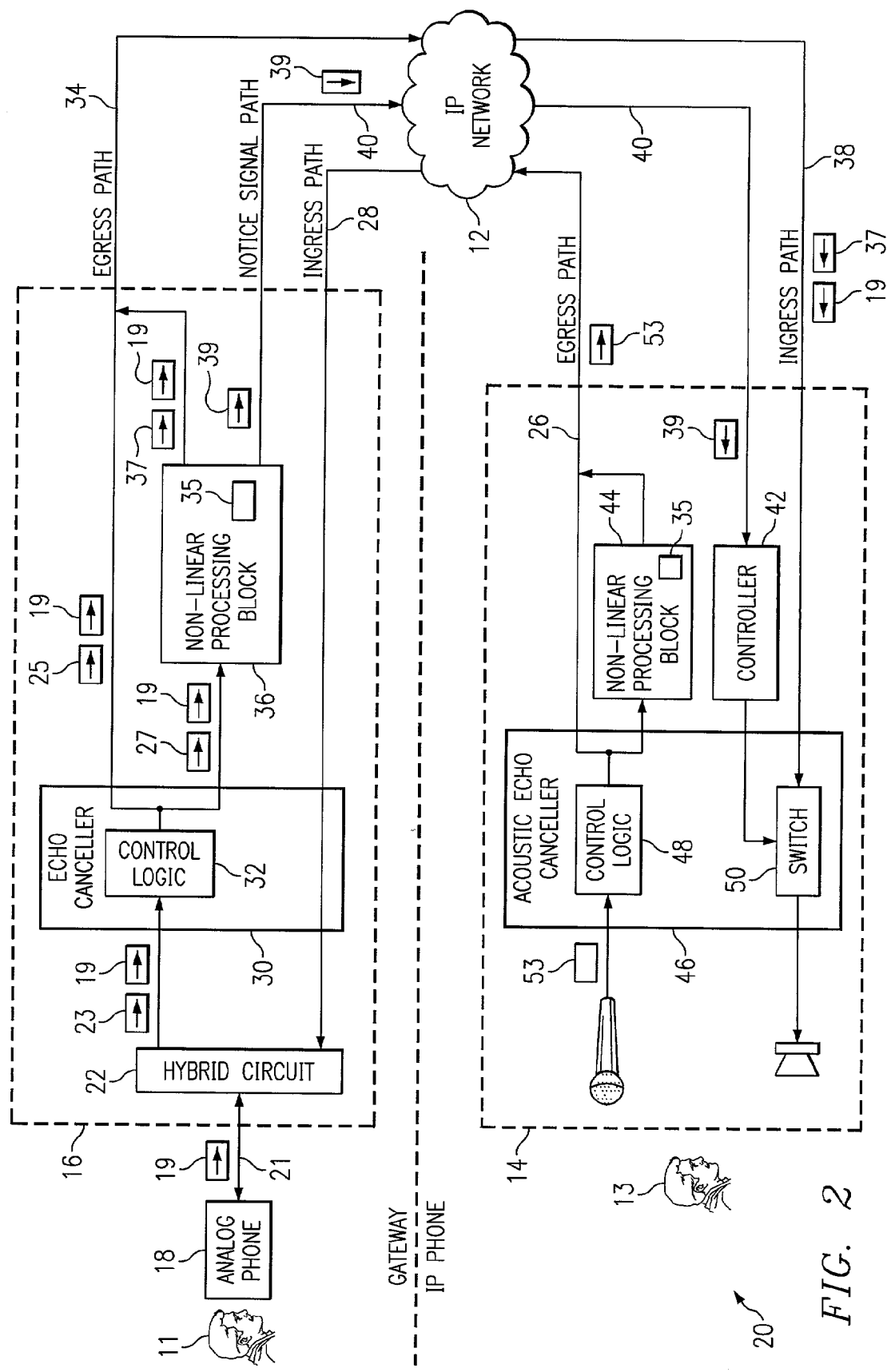
FIG. 2 is a block diagram illustrating an embodiment of a system for managing communication impairments between IP devices of the network of FIG. 1.

FIG. 2 is a block diagram illustrating details of one embodiment of system 20. Gateway 16 is coupled to analog phone 18 by a transmit and receive path 21. Analog phone 18 may be used by a user 11. In this embodiment, gateway 16 has an egress path 34, a notice signal path 40, and an ingress path 28 that couples gateway 16 to IP network 12. IP phone 14 for use by a user 13 has an egress path 26, an ingress path 38, and notice signal path 40 that couples IP phone 14 to IP network 12.

In this embodiment, gateway 16 includes a hybrid circuit 22, an echo canceller 30, and a non-linear processing block 36. Transmit and receive path 21 is coupled to hybrid circuit 22 of gateway 16. Hybrid circuit 22 is coupled to a control logic unit 32 of echo canceller 30. Control logic unit 32 is coupled to egress path 34 and non-linear processing block 36. Non-linear processing block 36 is coupled to notice signal path 40 and egress path 34. Hybrid circuit 22 converts an analog communication signal 19 received from analog phone 18 over transmit and receive path 21 into a digital format for transmission to echo canceller 30. Conversely, hybrid circuit 22 converts a digital communication signal 53 received over ingress path 28 into an analog format for transmission to analog phone 18. Echo canceller 30 reduces undesirable noise, such as an echo signal 23. Echo signal 23 may result from a variety of reasons, such as the conversions performed by hybrid circuit 22, or signal distortions within gateway 16. If, in the process of reducing attenuating echo signal 23, echo canceller 30 inadvertently attenuates the natural background noise associated with communication signal 19 or yields a reduced echo signal 27 by failing to sufficiently reduce echo signal 23, non-linear processing block 36 masks the undesirable noise. In one embodiment, non-linear processing block 36 masks the lack of natural background noise by inserting comfort noise, represented by reference numeral 35, into the undesirable noise. As used herein, "comfort noise" refers to any signal that reduces, eliminates, and/or hides the effects of undesirable noise by canceling or masking the noise. For example, low level background noise or other types of artificial background noise may be used as comfort noise 35 to mask the effect of having no perceivable background noise in the transmitted signal stream. One skilled in the art will be able to ascertain different types of comfort noise 35 used to mask the effects of undesirable noise. Non-linear processing block transmits masked echo signal 37, communication signal 19, and/or notice signal 39 to IP phone 14.

In this embodiment, IP phone 14 includes an acoustic echo canceller 46 having a control logic unit 48 and a switch 50. IP phone 14 also includes a non-linear processing block 44 and a controller 42. Control logic unit 48 is coupled to egress path 26 and a non-linear processing block 44. Switch 50 is coupled to controller 42. Controller 42 is coupled to notice signal path 40. Acoustic echo canceller 46 reduces negative effects of undesirable noise resulting from converting the voice of user 13 to a digital format, or any echo caused by receiving communication signal 19. Non-linear processing block 44 masks the effects of undesirable noise that acoustic echo canceller 46 failed to sufficiently minimize by inserting comfort noise 35 into the undesirable noise.

In operation, user 11 speaks into analog phone 18. Analog phone 18 converts the speech into communication signal 19. Communication signal 19 is transmitted to gateway 16 over transmit and receive path 21. Hybrid circuit 22 receives communication signal 19 and converts communication signal 19 into a digital format suitable for transmission over IP network 12. During the conversion, a certain amount of unwanted noise, such as echo signal 23, may be produced. Echo signal 23 may also be produced from receiving communication signal 53. Digitized communication signal 19, now accompanied by echo signal 23, travels to echo canceller 30. Echo canceller 30 attempts to reduce the negative effects of echo signal 23 to an acceptable level. Control logic unit 32 of echo canceller 30 determines whether enough of echo signal 23 has been cancelled and whether the natural background noise has been inadvertently attenuated in the process of reducing echo signal 23. If control logic unit 32 determines that enough of echo signal 23 has been cancelled and that the natural background noise has not been inadvertently attenuated, then control logic unit 32 sends communication signal 19 and acceptable echo signal 25—echo signal 23 reduced to an acceptable level and still having natural background noise—through egress path 34 of gateway 16. Communication signal 19 and acceptable echo signal 25 are then sent to IP phone 14 through IP network 12, ingress path 38 of IP phone 14, acoustic echo canceller 46, and a transmit path 54.

However, if control logic unit 32 determines that cancellation of echo signal 23 was insufficient, or that cancellation of echo signal 23 resulted in cancellation of the natural background noise, then communication signal 19 and reduced echo signal 27—echo signal 23 that is either not at an acceptable level or resulted in reducing the natural background noise to an unacceptable level—are sent through non-linear processing block 36. Non-linear processing block 36 masks reduced echo signal 27 by inserting comfort noise 35 into reduced echo signal 27. After masking reduced echo signal 27 and thus producing a masked echo signal 37, non-linear processing block 36 sends communication signal 19 and masked echo signal 37 to egress path 34 of gateway 16, where the signals then travel to the IP phone 14 through IP network 12 and ingress path 38 of IP phone 14.

Upon receiving incoming masked echo signal 37, IP phone 14 may mistake masked echo signal 37 as communication signal 19 of user 11. As such, IP phone 14, in half-duplex mode, may erroneously attenuate any outgoing communication signal 53 of user 13 that is transmitted as the incoming masked echo signal 37 arrives. In one embodiment involving voice communication, the attenuation results in user 11 hearing only a low volume noise or a dull sound rather than the speech of user 13 using IP phone 14.

In one embodiment of the invention, non-linear processing block 36 transmits a notice signal 39 to IP phone 14 through notice signal path 40 at any time between receiving reduced echo signal 27 and transmitting masked echo signal 37. Notice signal 39 may indicate the production and/or transmission of masked echo signal 37, or insertion of comfort noise 35. In one embodiment, notice signal 39 reaches controller 42 of IP phone 14 through IP network 12 before masked echo signal 37 reaches IP phone 14. Upon receiving notice signal 39, controller 42 directs switch 50 of acoustic echo canceller 46 to give priority to any outgoing communication signal 53 that is being transmitted at substantially the same time as receiving masked echo signal 37. Granting priority to outgoing communication allows communication signal 53 to reach user 11 without being attenuated, resulting in better reception for user 11 and overall improvement in communication session. In one embodiment, notice signal 39 may be generated by control logic unit 32 of echo canceller 30 after reduced echo signal 27 is sent to non-linear processing block 36.

Depending on the configuration of IP phone 14, there are many ways to prioritize communication signal 53 over masked echo signal 37. For example, in one embodiment, controller 42 may direct acoustic echo canceller 46 to refrain from attenuating any outgoing communication signal 53 through switch 50. In another embodiment, switch 50 may block out or ignore masked echo signal 37. In another embodiment, controller 42 may directly command acoustic echo canceller 46 to ignore masked echo signal 37. One skilled in the art will be able to ascertain different ways to prioritize communication signal 53 so that communication signal 53 reaches its destination endpoint without being erroneously attenuated.

Non-linear processing block 36 may send notice signal 39 to IP phone 14 before, during or after non-linear processing block 36 masks reduced echo signal 27. The required quality level of communication is a factor in determining the timing of transmitting notice signal 39. If no erroneous attenuation at IP phone 14 may be tolerated, then notice signal 39 must reach controller 42 in time for acoustic echo canceller 46 to grant priority to outgoing communication signal 53. To that end, in one embodiment, notice signal 39 is transmitted before non-linear processing block 36 masks reduced echo signal 27 to allow more time for notice signal 39 to reach controller 42. Other ways of timely delivery of notice signal 39 to IP phone 14 may be ascertained by one skilled in the art.

If a certain amount of erroneous attenuation may be tolerated, notice signal 39 may be transmitted during or after non-linear processing block 36 masks reduced echo signal 27. Furthermore, if notice signal path 40 is such that notice signal 39 can reach IP phone 14 before masked echo signal 37 even if notice signal 39 is transmitted after masked echo signal 37 is transmitted, then the timing of notice signal 39 transmission may not be an issue.

Notice signal path 40 may reside within or outside of IP network 12. Any path, such as in-band or out-of-band, capable of carrying notice signal 39 in time to produce a desired quality of communication may be used as notice signal path 40. Notice signal path 40 may also be a direct wire or wireless link. Furthermore, notice signal 39 may also be transmitted through paths other than notice signal path 40. For example, notice signal 39 may be sent as a part of a Real Time Transport Protocol ("RTP") stream that is transmitted from gateway 16 to IP phone 14 through egress path 34.

System 20 prevents one endpoint from inadvertently causing inappropriate attenuation at another endpoint. This results in a higher quality of communication between endpoints.

Figure 3:
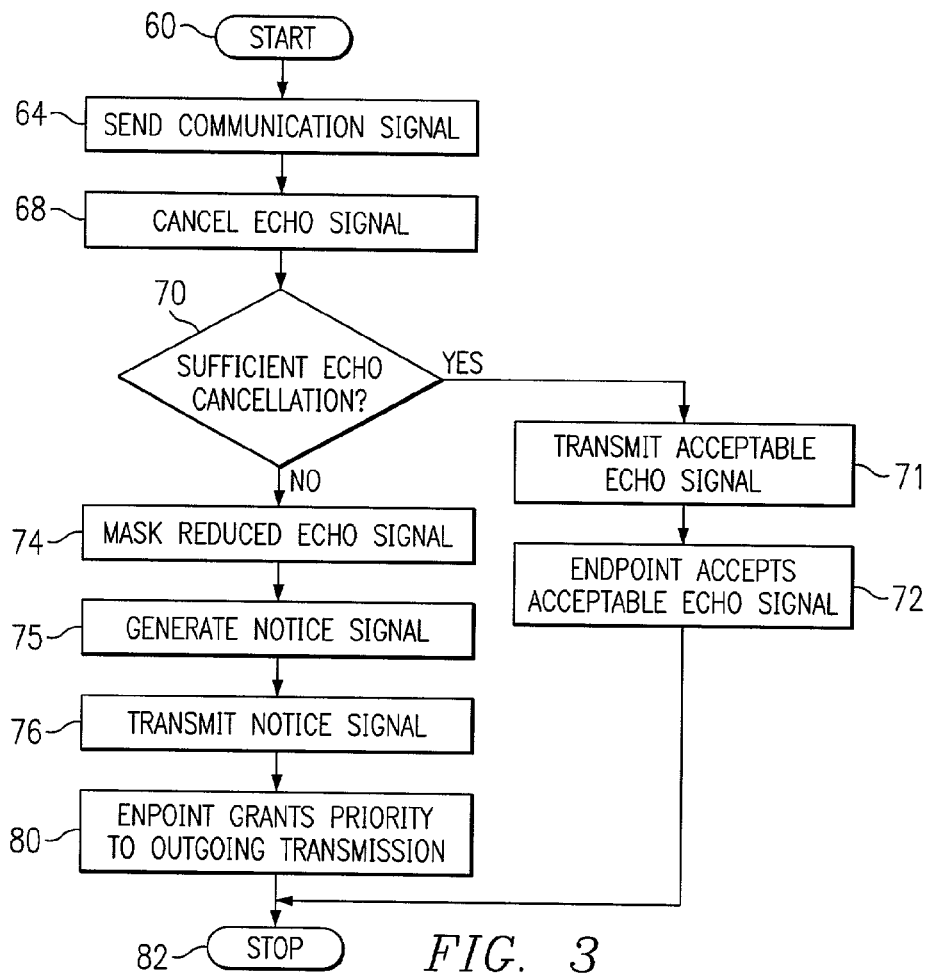
FIG. 3 is a flow chart illustrating an embodiment of a method of managing communication impairments between IP devices.

FIG. 3 is a flow chart illustrating one embodiment of a method 62 of managing communication impairments. Method 62 may be implemented by system 20 illustrated in FIG. 2 or other suitable systems. Method 62 starts at step 60. At step 64, analog phone 18 using gateway 16 sends communication signal 19 to IP phone 14. Communication signal 19 is digitized by hybrid circuit 22, yielding a digital form of communication signal 19 and echo signal 23. At step 68, echo canceller 30 attempts to cancel echo signal 23. Control logic unit 32 of echo canceller 30 determines, at step 70, whether cancellation of echo signal 23 was sufficient so that echo signal 23 is not too loud and that the natural background noise was maintained at a perceivable level. If echo cancellation was sufficiently done for signal transmission, then resulting acceptable echo signal 25 is transmitted to IP phone 14 at step 71. IP phone 14 accepts acceptable echo signal 25 at step 72.

If control logic unit 32 determines, at step 70, that echo cancellation was insufficient for a reason, such as unacceptable attenuation of the natural background noise or insufficient cancellation of echo signal 23, then non-linear processing block 30 masks reduced echo signal 27 at step 74. Non-linear processing block 36 masks reduced echo signal 27 by inserting comfort noise 35 into reduced echo signal 27, yielding masked echo signal 37. Non-linear processing block 36 generates notice signal 39 at step 75, indicating, in one embodiment, the transmission or pending transmission of masked echo signal 35. In one embodiment, notice signal 39 is then transmitted to IP phone 14 at step 76. At step 80, in response to receiving notice signal 39, IP phone 14 grants priority to outgoing communication signal 53 over incoming masked echo signal 37, so that masked echo signal 37 does not confuse IP phone 14 into attenuating outgoing communication signal 53. Method 62 concludes at step 82. The parties of a communication session using method 62 experience an improvement in transmission from one endpoint to another endpoint. The improvement results from one endpoint helping the other endpoint to avoid erroneous attenuation of communication signal 53 by warning the other endpoint of incoming error-causing noises such as masked echo signal 37.

Step 74 of masking reduced echo signal 27 may be performed before, during, or after steps 75 and 76 of generating and transmitting notice signal 39. Furthermore, step 75 of generating notice signal may be performed by other components, such as echo canceller 30. Step 80 of granting priority to outgoing communication signal 53 over masked echo signal 37 may be performed in a number of ways. This prioritization avoids communication 53 from being attenuated at IP phone 14 because of masked echo signal 37. In one embodiment, IP phone 14 ignores masked echo signal and refrains from attenuating communication signal 53. In another embodiment, IP phone 14 may drop masked echo signal 37 at controller 42 or acoustic echo canceller 46. Avoiding erroneous attenuation results in improved transmission and reception of communication signals.

Method 62 may be further used to notify IP phone 14 to accept any incoming communication signal 19 after IP phone 14 has been notified to grant priority to outgoing communication signal 53. This may occur when masked echo signal 37 is followed by communication signal 19. In half-duplex operation, receiving communication signal 19 at about the same time as the transmission of communication signal 53 is a proper basis for attenuating communication signal 53. As such, communication signal 19 should be accepted. To that end, in one embodiment, non-linear processing block 36 may generate a notice signal 39 at step 75 indicating that no signal has been masked. Once that notice signal 39 has been received by controller 42 of IP phone 14, controller 42 directs acoustic echo canceller 46 through switch 50 to accept incoming communication signal 19.

FIG. 4 is a block diagram illustrating another embodiment of system 20 for managing communication impairments between IP devices. Only the portions with different components than those shown in FIG. 2 are discussed. Here, gateway 16 includes non-linear processing block 36 having a switch 41. Gateway 16 also includes a controller 84. Controller 84 is coupled to switch 41. Controller 84 is also coupled to notice signal path 40. IP phone 14 includes a speakerphone switch 87, which is coupled to notice signal path 40.

In operation, user 13 using IP phone 14 switches the IP phone 14 into speakerphone operation in half-duplex mode. In response, speakerphone switch 87 of IP phone 14 generates and transmits a status signal 43 to controller 84 of gateway 16 through notice signal path 40. Status signal 43 may indicate that IP phone 14 is conducting speakerphone operation in half-duplex mode. Status signal 43 travels over notice signal path 40 and IP network 12. Upon receiving status signal 43, controller 84 directs non-linear processing block 36 to suppress transmitting comfort noise 35. In one embodiment, comfort noise 35 may be suppressed from transmission by refraining from inserting comfort noise 35 into undesirable noise such as reduced echo signal 27. In one embodiment, non-linear processing block 36 suppresses masking of reduced echo signal 27 and instead, inserts a silent signal 89 into reduced echo signal 27. Reduced echo signal 27 hidden by silence signal 89 is then transmitted to IP phone 14 through egress path 34 of gateway 16.

In one embodiment, speakerphone switch 87 may generate and transmit status signal 43 at approximately the same time as when second user 13 activates IP phone 14's speakerphone operation in half-duplex mode. For example, speakerphone switch 87 can generate and transmit status signal 43 before, during, or after the IP phone 14 goes into speakerphone operation. Whether status signal 43 is generated and transmitted before, during, or after IP phone 14 goes into speakerphone operation depends on the required level of quality of communication, analogous to the discussion above on the timing of generating and transmitting notice signal 39 at steps 75 and 76 of method 62. Furthermore, status signal 43 may be transmitted through paths other than notice signal path 40. For example, speakerphone switch 87 may send status signal 43 as a part of a RTP stream that is transmitted from IP phone 14 to gateway 16 through egress path 26 of IP phone 14.

FIG. 5 is a flow chart illustrating one embodiment of a method 90. Method 90 may be implemented by system 20 shown in FIG. 4 or other systems. Method 90 starts at step 91 from IP phone 14. Using IP phone 14, user 13 invokes speakerphone operation in half-duplex mode at step 92. In response to the invocation at step 92, speakerphone switch 87 generates status signal 43 at step 94. In one embodiment, status signal 43 is transmitted to gateway 16 through notice signal path 40 and IP network 12 at step 96. At step 98, controller 84 of gateway 16 receives status signal 43.

Controller 84 directs switch 41 of non-linear processing block 36 to suppress transmitting comfort noise 35 at step 100. Method 90 concludes at step 102.

Method 90 may be further used to send a status signal 43 indicating that IP phone 14 is no longer in speakerphone operation. User 13 may switch off IP phone 14's speakerphone operation. In one embodiment, user 13 may switch from a speakerphone mode to a handset mode. Then at steps 94 and 96, speakerphone switch 87 may generate and transmit status signal 43 indicating that IP phone 14 is no longer in speakerphone operation. Status signal 43 travels through notice signal path 40, IP network 12, and reaches controller 84. In response, controller 84 directs switch 41 of non-linear processing block 36 to commence masking reduced echo signal 27 with comfort noise 35.

Methods and systems described in detail above offer a solution to erroneous attenuation of outgoing signal communication signals 19 and 53. One benefit from the invention is that either user 11 or user 13 will not send or receive low volume signal due to inappropriate attenuation.

Although the present invention has been described in detail, it should be understood that various changes, substitutions, and alterations can be made hereto without departing from the spirit and scope of the invention as defined by the appended claims.

What is claimed is:

1. A method for managing communication impairments between Internet Protocol devices, comprising:
    detecting masking of an echo signal by a first endpoint, the echo signal generated by the first endpoint for transmission to a second endpoint;
    in response to the detection, sending a notice signal to the second endpoint, the notice signal indicating that the echo signal is being masked:
    in response to the notice signal, prioritizing, over the masked echo signal, any outgoing signal transmitted by the second endpoint;
    detecting a bypass of a non-linear processing block by a second signal, the second signal generated by the first endpoint for transmission to the second endpoint, wherein the non-linear processing block is operable to mask the second signal;
    sending a second notice signal to the second endpoint indicating the detection of the bypass; and
    in response to the second notice signal, accepting the second signal at the second endpoint.

2. The method of claim 1, wherein detecting the bypass of the non-linear processing block comprises detecting a pending bypass of the non-linear processing block.

3. A method for managing communication impairments between Internet Protocol devices, comprising:
    detecting masking of an echo signal by a first endpoint the echo signal generated by the first endpoint for transmission to a second endpoint;
    in response to the detection, sending a notice signal to the second endpoint, the notice signal indicating that the echo signal is being masked;
    in response to the notice signal, prioritizing, over the masked echo signal, any outgoing signal transmitted by the second endpoint and;
    wherein detecting that the echo signal is being masked comprises detecting a pending masking of the echo signal.

4. A system for managing communication impairments, comprising:
    a Internet Protocol device operable to;
    determine that noise has been transmitted by the Internet Protocol device; and
    in response to the determination, send a notice signal, the notice signal indicating that the noise is transmitted;
    an endpoint coupled to the Internet Protocol device through an Internet Protocol network the endpoint operable to grant, in response to the notice signal, priority to any outgoing signal over the noise; and
    wherein the Internet Protocol device is further operable to detect a transmission of a communication signal instead of the noise, and in response to the determination, send a second notice signal to the endpoint indicating that the communication signal is transmitted.

5. The system of claim 4, wherein the endpoint is operable to accept the communication signal in response to the second notice signal.

6. A system for managing communication impairments, comprising:
    a Internet Protocol device operable to:
    determine that noise has been transmitted by the Internet Protocol device; and
    in response to the determination, send a notice signal, the notice signal indicating that the noise is transmitted;
    an endpoint coupled to the Internet Protocol device through an Internet Protocol network the endpoint operable to grant in response to the notice signal, priority to any outgoing signal over the noise; and
    wherein the Internet Protocol device is further operable to detect a pending transmission of the communication signal instead of the noise, and in response to the determination, send the second notice signal to the endpoint indicating that the communication signal is pending transmission.

7. A system for managing communication impairments, comprising:
    a Internet Protocol device operable to:
    determine that noise has been transmitted by the Internet Protocol device; and
    in response to the determination, send a notice signal, the notice signal indicating that the noise is transmitted; and
    an endpoint coupled to the Internet Protocol device through an Internet Protocol network, the endpoint operable to grant, in response to the notice signal, priority to any outgoing signal over the noise; and
    wherein the endpoint is a Internet Protocol speakerphone comprising an acoustic echo canceller and a speakerphone controller, wherein the acoustic echo canceller is operable to suppress the signal and the speakerphone controller is operable to receive the notice signal and direct the acoustic echo canceller to ignore, at the speakerphone, the masked echo transmitted by the Internet Protocol device.

8. A system for managing communication impairments, comprising:
    a control means for receiving a notice indicating a transmission of a masked echo and in response to the notice, generating a first signal;
    a communication means for receiving the first signal, and in response to the first signal, giving priority, over the incoming masked echo, to any outgoing signal transmitted from the communication means;
    a means for receiving a second notice indicating a transmission of a communication signal instead of the masked echo and in response to the second notice, generating a second signal; and a means for receiving the second signal, and in response to the second signal, accepting the communication signal.

9. The system of claim 8, and further comprising a means for sending the second notice.

10. A method for managing communication impairments between an Internet Protocol phone and an Internet Protocol device, comprising:

receiving a status signal at the device indicating that the phone is operating as a speakerphone; and in response to the status signal, suppressing transmission of any comfort noise to the phone.

11. The method of claim 10, and further comprising sending the status signal to the device, the status signal indicating that the phone is operating as a speakerphone.

12. The method of claim 11, wherein the status signal is sent before the phone begins operating as a speakerphone.

13. The method of claim 11, wherein sending the status signal comprises sending the signal with a Real Time Transport Protocol signal.

14. The method of claim 10, and further comprising:

receiving a second status signal at the device, the second status signal indicating that the phone halted operation as the speakerphone; and in response to the second status signal, transmitting the comfort noise to the phone.

15. The method of claim 10, wherein operating as the speakerphone comprises conducting half-duplex operation.

16. The method of claim 10, wherein the device comprises a second Internet Protocol phone.

17. The method of claim 10, and further comprising inserting a silent signal into any noise transmitted to the phone.

18. A method for managing communication impairments between an Internet Protocol phone and an Internet Protocol device, comprising:

receiving a status signal at the device indicating that the phone is operating as the speakerphone;

in response to the status signal, inserting a silent signal into an outgoing noise transmitted to the phone;

determining that the phone is operating in a handset mode by determining that the phone is pending operation in the handset mode;

transmitting a second status signal to the device indicating that the phone operating in a handset mode;

in response to the second status signal, inserting a comfort noise into the outgoing noise transmitted to the phone; and wherein determining that the phone is operating in the handset mode comprises determining that the phone is pending operation in the handset mode.

19. The method of claim 18, and further comprising sending the status signal.

20. The method of claim 19, wherein the status signal is sent with a Real Time Transport Protocol stream.

21. The method of claim 18, wherein the status signal indicates that the phone is pending operation as the speakerphone.

22. A system for managing communication impairments between Internet Protocol devices, comprising:

a communication device operable to transmit a signal;

a non-linear processor coupled to the communication, the non-linear processor operable to insert a silent signal into the signal; and a controller coupled to the non-linear processor, the controller operable to direct the non-linear processor to insert the silent signal in response to receiving a status signal an endpoint operable to send the status signal indicating that the endpoint is operating as a speakerphone; and wherein the non-linear processor is operable to insert a comfort noise into the signal and the controller is operable to command the non-linear processor to insert the comfort noise in response to a second status signal, the second status signal indicating that the endpoint halted operating as a speakerphone.

23. The system of claim 22, wherein the status signal indicates that an endpoint is conducting half-duplex operation.

24. The system of claim 22, wherein operating as the speakerphone comprises conducting half-duplex operation.

25. The system of claim 22, wherein the endpoint is operable to send the status signal with a Real Time Transport Protocol signal.

26. The system of claim 22, wherein the endpoint is operable to send the status signal before beginning to operate as the speakerphone.

* * * * *